(12) United States Patent
Barry et al.

(10) Patent No.: US 8,095,440 B2
(45) Date of Patent: Jan. 10, 2012

(54) METHODS AND SYSTEMS FOR EFFECTING PAYMENT CARD TRANSACTIONS

(75) Inventors: Gerard J. Barry, Salthill (IE); John Duffy, Ballinahown (IE)

(73) Assignee: Mainline Corporate Holdings Limited, Galway (IE)

( * ) Notice: Subject to any disclaimer, the term of this patent is extended or adjusted under 35 U.S.C. 154(b) by 1239 days.

(21) Appl. No.: 10/520,996

(22) PCT Filed: Jul. 14, 2003

(86) PCT No.: PCT/IE03/00101
§ 371 (c)(1),
(2), (4) Date: Feb. 14, 2005

(87) PCT Pub. No.: WO2004/008399
PCT Pub. Date: Jan. 22, 2004

(65) Prior Publication Data
US 2005/0131806 A1 Jun. 16, 2005

(30) Foreign Application Priority Data
Jul. 12, 2002 (IE) .................................. S20020579
Jan. 10, 2003 (WO) ........................ PCT/IE03/00002

(51) Int. Cl.
*G06Q 40/00* (2006.01)
(52) U.S. Cl. ................ 705/35; 705/38; 705/69; 705/39; 705/52; 705/53
(58) Field of Classification Search ............... 705/35, 705/38, 39, 53, 52, 69
See application file for complete search history.

(56) References Cited

U.S. PATENT DOCUMENTS
6,339,765 B1 1/2002 Maher
(Continued)

FOREIGN PATENT DOCUMENTS
EP 1018711 A1 7/2000
(Continued)

OTHER PUBLICATIONS
Advanced Management Journal v67n3 pp. 22-30 Managerial issues for expanding into international web-based electronic commerce. ISSn :0749-7075 JTNL Code :AMJ.*

*Primary Examiner* — Ella Colbert
*Assistant Examiner* — John Anderson
(74) *Attorney, Agent, or Firm* — Meschkow & Gresham, P.L.C.

(57) ABSTRACT

The present invention relates to card payment systems. In particular, the present invention relates to systems and methods for processing payment card transactions in a dynamic currency conversion and/or multi-currency scheme. To operate correctly, ghost transactions are used. However to prevent duplication of debits against the Card Holder, these "ghost copy" transactions must not be processed into the card schemes with the normal transactions. Thus the Acquirer's and/or third parties host systems have to be amended, in addition to modifications to the related accounting thereof. To overcome this necessity, the present invention provides a method for effecting the performance of a payment card transaction for a first transaction amount in a first currency, between a first merchant and a first payment card holder, the method comprising the steps of a) creating a first payment card transaction record between the first merchant and a second cardholder for the first transaction amount, b) creating a second payment card transaction record between a second merchant and the first cardholder, wherein the second transaction record identifies a second transaction amount in a second currency which equates to the first transaction amount converted into the second currency, and submitting the first transaction record and the second transaction record for processing as payment card transactions.

29 Claims, 5 Drawing Sheets

U.S. PATENT DOCUMENTS 6,721,715 B2 * 4/2004 Nemzow .................. 705/26
2002/0174031 A1 * 11/2002 Weiss ..................... 705/26

FOREIGN PATENT DOCUMENTS

| | | | |
|---|---|---|---|
| EP | 1058217 | * | 12/2000 |
| EP | 1058217 A2 | * | 12/2000 |
| WO | WO0104846 A1 | | 1/2001 |
| WO | WO0139062 A1 | | 5/2001 |
| WO | WO0186597 A2 | | 11/2001 |
| WO | WO02071194 | * | 9/2002 |
| WO | WO02071194 A2 | | 9/2002 |

* cited by examiner

Figure 1

| Date | CardHolder Name | CardHolder Card Number | Expire Date | Merchant Name | Merchant Code # | Transaction Amount e.g. |
|---|---|---|---|---|---|---|
| 23-May-02 | Mr. Joe Soap | 1234 5678 9123 4560 | 12 2003 | A Trader | 841480725 | 1,234.56 |

| Date | Cardholder Name | CardHolder Card Number | Expire Date | Merchant Name | Merchant Code # | Transaction Amount e.g. | Exchange Rate, e.g. ₩ | CardHolder Converted Amount, e.g. ₩ |
|---|---|---|---|---|---|---|---|---|
| 23-May-02 | Mr. John Donne | 9876 5432 1987 6543 | 11 2004 | A Trader | 841480725 | 2,654.32 | 119.105 | 316,142 |

| Date | Cardholder Name | CardHolder Card Number | Expire Date | Merchant Name | Merchant Code # | Transaction Amount e.g. | Exchange Rate, e.g. W | CardHolder Converted Amount, e.g. W |
|---|---|---|---|---|---|---|---|---|
| 23-May-02 | TCardholder | 1111 1111 1111 1111 | 1 2022 | A Trader | 841480725 | 2,654.32 | | |
| B1 | | | | | | | | |

| Date | Cardholder Name | CardHolder Card Number | Expire Date | Merchant Name | Merchant Code # | Transaction Amount e.g. | Exchange Rate, e.g. W | CardHolder Converted Amount, e.g. W |
|---|---|---|---|---|---|---|---|---|
| 23-May-02 | Mr. John Donne | 9876 5432 1987 6543 | 11 2004 | TMerchant | 999999999 | 2,654.32 | 119,105 | 316,142 |
| B2 | | | | | | | | |

| Date | Cardholder Name | CardHolder Card Number | Expire Date | Merchant Name | Merchant Code # | Transaction Amount e.g. | Exchange Rate, e.g. W | CardHolder Converted Amount, e.g. W |
|---|---|---|---|---|---|---|---|---|
| 23-May-02 | TCardholder | 1111 1111 1111 1111 | 1 2022 | TMerchant | 999999999 | 2,654.32 | | |
| B3 | | | | | | | | |

METHODS AND SYSTEMS FOR EFFECTING PAYMENT CARD TRANSACTIONS

FIELD OF THE INVENTION

The present invention relates to card payment systems. In particular, the present invention relates to systems and methods for processing payment card transactions in a dynamic currency conversion and/or multi-currency scheme.

BACKGROUND TO THE INVENTION

Several types of card payment systems are available, examples of which include credit cards, charge cards and debit cards. In general, transactions involving a card payment are conducted in the currency of the merchant. Thus, if an Irish credit card is used for a purchase in the USA, the currency of the transaction will probably be in US$. The transaction value will subsequently be converted into an equivalent EURO value by the credit card holder's bank but is unknown at the point of sale. This equivalent EURO value will subsequently appear on the credit card holder's statement. This restriction can be inconvenient for cardholders travelling abroad, as they are unsure of the exact value of the transaction in their own currency at the point and time of sale.

Dynamic currency conversion overcomes these limitations by performing the currency conversion at the point of sale at the time the customer makes a purchase using their payment card. An example of a dynamic currency conversion system is described in WO01/0486. With dynamic currency conversion processes, the cardholder is informed at the point of purchase as to what amount they are paying in the cardholder's own currency, whilst the merchant obtains payment in the merchant's own currency. This process is possible because the function of converting from the currency of the merchant to the currency of the cardholder is performed at the point of sale terminal rather than in the computer systems of the bank in which the cardholder has their credit card account. In the context of the present application, the term bank refers generally to any financial institution, which offers payment card services and may be taken to include, for example, building societies and credit unions.

In addition to dynamic currency conversion schemes, multi currency schemes also operate to perform the currency conversion part of the transaction prior to submitting the transaction records to the banks for processing. However, in a multi currency scheme the conversion process does not necessarily take place at the point or time of sale but is converted subsequently.

Payment card transactions are processed and submitted from the merchants to the financial institutions, or an intermediary, as transaction records. Each transaction has an associated transaction record, containing the details of the transaction. Before the introduction of dynamic currency conversion in payment card transactions, an extract of a transaction record would have looked something along the lines of the transaction "A0" shown in FIG. 1.

Figures 1, 2:
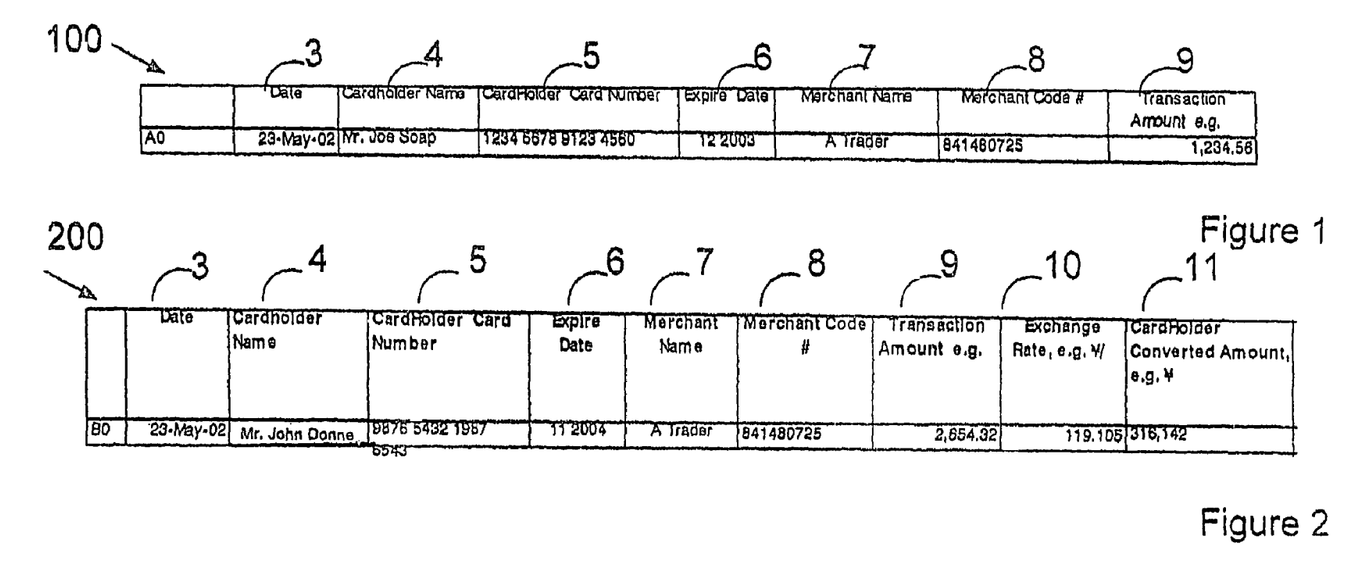
FIG. 1 is an example of a transaction record according to the prior art.
FIG. 2 is an example of a second transaction record known from the prior art.

The precise fields and formats of fields used may vary from bank to bank. In brief, the data in the fields identifies the date of the transaction, the name of the holder of the payment card, the card number of the payment card, the expiry date of the payment card, the name of the merchant who is performing the transaction, the code of the merchant performing the transaction and the amount of the transaction.

With the introduction of dynamic currency conversion transactions, a number of additional fields are required to be "captured". An extract of an exemplary transaction record in a dynamic currency conversion environment is shown in the transaction "B0" in FIG. 2. The additional fields to be captured comprise the converted currency element of the transaction, which may include the converted amount in the currency of the cardholder's payment card account, which the cardholder will see on their statement and the exchange rate used to perform the conversion. The currency of the cardholder may also be required.

Normal transactions (transactions processed in the currency of the merchant only, an example of which is shown in FIG. 1) are processed conventionally typically through the acquiring bank of the merchant, whereas the dynamic currency conversion transactions may be separated from the normal transactions and may be routed to a dynamic currency conversion system, which may be separate from the acquiring bank, for transmission into the card schemes and which may be settled back to the acquiring bank and/or the merchant via a multi-currency payment card processing bank or other route. A multi-currency payment card processing bank is a bank which is capable of processing payment card transactions from merchants in more than one currency. The separation function may be handled by a POS device dispatching normal and/or converted transactions to a first host and normal and/or converted transactions to another host or hosts. The separation function may also be performed before the POS device, at the POS device and/or post the POS device by an acquirer and/or $3^{rd}$ party host, server or switch service and/or any other suitable separation means.

For the purposes of the Acquirer and/or other third parties paying the merchant and/or providing the Merchant with the statement in relation to all merchant transactions (rather than two separate regular payments and/or two separate statements), the normal and dynamic currency conversion transactions need to be amalgamated in some way. Accordingly, for settlement purposes vis a vis the acquirer to the merchant, and likewise the statement from the acquirer to the merchant and/or for related card scheme merchant service fee charges deducted & payable to the acquirer by the merchant, a "ghost copy" of the dynamic currency conversion transactions may be incorporated/sent to the Acquirer's or other third parties host. However, to prevent duplication of debits against the Card Holder, these "ghost copy" transactions must not be processed into the card schemes with the normal transactions. Thus the Acquirer's and/or third parties host systems have to be amended, in addition to modifications to the related accounting thereof.

This presents a significant difficulty for acquiring banks interested in using dynamic currency conversion services, as the acquiring banks have to amend their computer systems to deal with the splitting/amalgamation for the purposes of providing a statement to the merchant and payment/settlement to the merchant. To facilitate dynamic currency conversion services, a significant amount of computer code is required to be re-written on the banks' computer systems.

Accordingly, although it appears that a significant number of banks would like to offer dynamic currency conversion payment card facilities, the diversion of computer resources which are frequently scarce and in several cases must be booked years in advance makes the proposition unattractive. Furthermore, the necessity of having to interfere with existing bank computer IT systems/procedures is something that banks are extremely reluctant to risk.

This situation is to be contrasted to the position regarding the software on the payment card terminals located at the merchant locations or even at an intermediate host, where it is relatively easy to have independent resources allocated to amend the software in the payment card terminals or an intermediate host. Any changes to software in either the payment card terminals or at an intermediate host are unlikely to interfere with the operation of the acquiring bank's host computer.

Accordingly, it is an object of the present invention to provide a method to effect the performance of a converted payment card transaction, which obviates the necessity for changes to the acquiring banks' host computer system.

SUMMARY OF THE INVENTION

Accordingly, a first embodiment of the invention provides a method for effecting the performance of a payment card transaction for a first transaction amount in a first currency, between a first merchant and a first payment card holder, the method comprising the steps of:
a) creating a first payment card transaction record between the first merchant and a second cardholder for the first transaction amount,
b) creating a second payment card transaction record between a second merchant and the first cardholder, wherein the second transaction record identifies a second transaction amount in a second currency which equates to the first transaction amount converted into the second currency, and
c) submitting the first transaction record and the second transaction record for processing as payment card transactions.

As the first cardholder is effectively replaced by a second cardholder in the first transaction record, the subsequent processing of the second transaction by a dynamic currency conversion operator will not cause a double debit in respect of the first cardholder. Thus the necessity of re-writing an acquirer's software to avoid any such related type double debit is avoided. Similarly, from the perspective of the acquirer and/or its merchant handling of transactions processed for the merchant, the acquirer systems do not have to be amended to introduce and/or receive ghost transactions for the purposes of amalgamation and/or calculating service charges for the merchant.

The second cardholder may be associated with the second merchant.

The step of submitting the first transaction record and the second transaction record for processing may comprise the step of submitting the first transaction record for processing as an unconverted payment transaction. The step of submitting the first transaction record and the second transaction record for processing may comprise the step of submitting the second transaction record for processing as a converted payment transaction.

Optionally, the invention may comprise the additional steps of creating a third payment card transaction record between the second cardholder and the second merchant for an amount in the first currency, which is the negative equivalent of the first amount and submitting the third transaction for payment processing. The third transaction may be submitted as an unconverted payment card transaction.

The advantage of this third transaction record is that it effectively cancels out the first transaction record vis a vis the second cardholder. Thus there is no need to correct the balances on the account of the second cardholder.

The method may comprise the initial step of determining whether a transaction is a dynamic currency convertible transaction prior to performing the steps of creating the one or more transaction records.

The method may comprise the initial step of receiving an indication of a payment card transaction for a first transaction amount in a first currency between a first merchant and a first payment card holder.

The method may comprise the step of posting the first and/or second and/or third transactions to the computer system associated with an acquiring bank.

The invention also provides a system adapted to effect the performance of a payment card transaction, the system comprising
means for receiving details of a transaction for a first transaction amount in a first currency, between a first merchant and a first payment card holder,
means for creating a first payment card transaction record between the first merchant and a second cardholder for the first transaction amount,
means for creating a second payment card transaction record between a second merchant and the first cardholder, wherein the second transaction record identifies a second transaction amount in a second currency which equates to the first transaction amount converted into the second currency, and
means for submitting created transaction records to a host for processing as payment card transactions.

The means for submitting created transaction records may be suitably adapted to submit the first transaction record for processing as an unconverted payment transaction. The means for submitting created transaction records may be suitably adapted to submit the second transaction record for processing as a converted payment transaction.

Optionally, the system may comprise means for creating a third payment card transaction record between the second cardholder and the second merchant for an amount in the first currency, which is the negative equivalent of the first amount and submitting the third transaction for payment processing. The means for submitting created transaction records may be suitably adapted to submit the third transaction record for processing as an unconverted payment transaction.

The system may comprise means for determining whether a transaction is a dynamic currency convertible transaction prior to performing the steps of creating the one or more transaction records.

In one embodiment the system comprises a payment card terminal. In this embodiment, the means for receiving details of the transaction for a first transaction amount in a first currency comprises the data entry means of the terminal, including for example smart card readers, magnetic strip readers and keypads. The means for receiving details may include means for retrieving the details of the merchant from the terminal memory. In a terminal, the means for creating the first and second payment transaction records may be implemented using appropriate software routines. The details for the second merchant and cardholder may suitably be stored in the terminal memory and retrieved by the means for creating the first and second payment transaction records as required when creating first and second payment transaction records.

In one embodiment the system comprises an intermediate host computer system adapted to receive payment transaction records from a payment card terminal or other device and route them for processing as either converted or unconverted transactions. In this embodiment, the means for receiving details of the transaction comprises means for receiving transaction records. The means for creating the first payment card transaction record and the means for creating the second payment card transaction may be implemented as software routines. The host may be an acquirer's host, a multi-currency bank's host, an intermediate host or any other host. Moreover an acquirer and/or a multi-currency bank may be one and the same person or entirely separate, i.e. in the acquirer and multi-currency (and/or its/their host) may be one entity, two independent entities within the same bank or two separate banks.

Other advantageous embodiments will be appreciated from the claims and description which follow.

BRIEF DESCRIPTION OF THE DRAWINGS

The invention will now be described in greater detail with reference to the accompanying drawings in which.

DETAILED DESCRIPTION OF THE DRAWINGS

The present invention is intended for use within a card payment system, and in particular for use with converted transactions. An exemplary scheme, illustrated in FIG. 3, comprises a number of POS (point of sale) terminal devices 1. The Terminal devices 1 are adapted to perform payment card transactions. Each device is associated with a merchant. In the exemplary configuration shown, an intermediate host 2 acts as an interface between the POS devices and the payment processing systems of the banks and currency conversion schemes.

Figure 3:
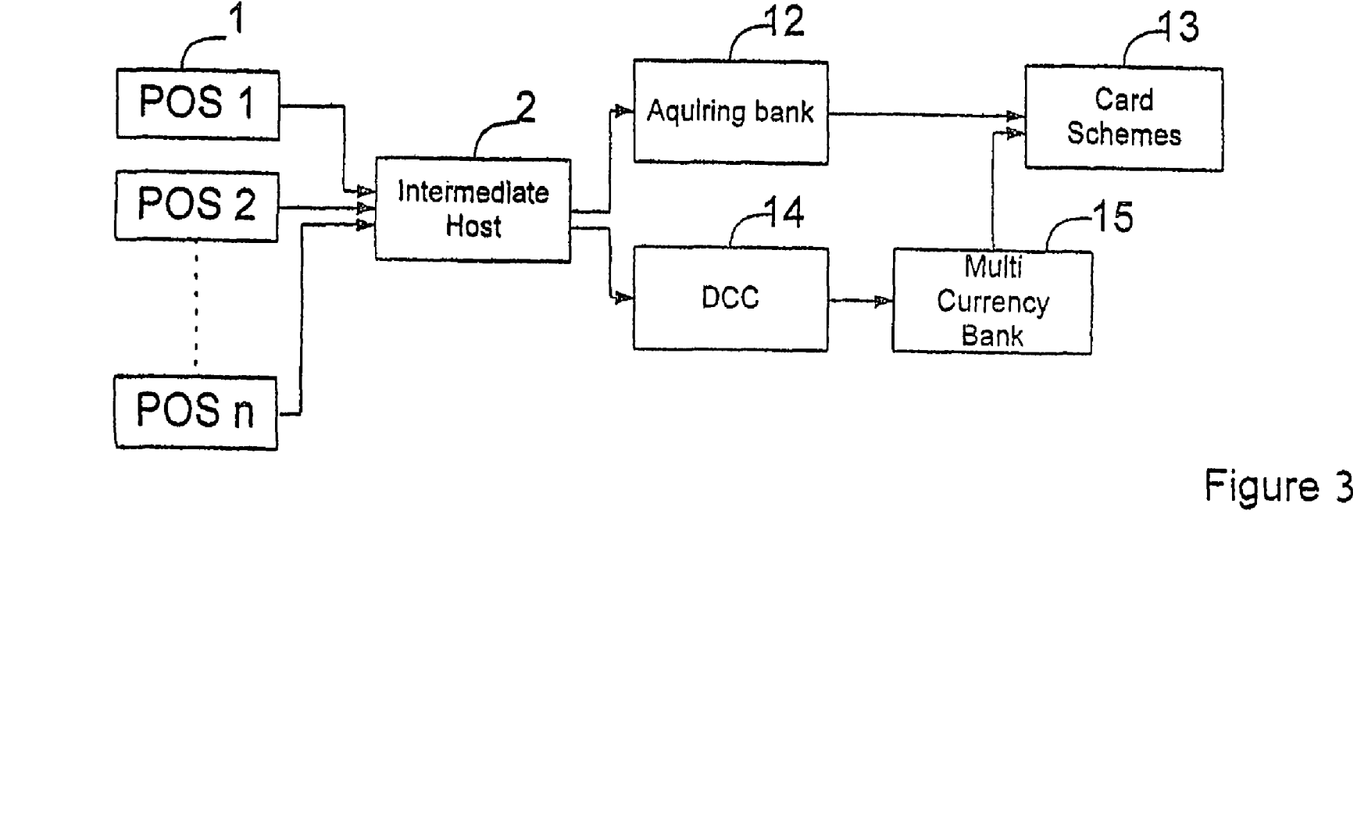
FIG. 3 is a block diagram representation of a system suitable for implementing the present invention.

Payment card transactions are conventionally initiated by a cardholder presenting a payment card at the point of sale at the time of making a purchase. The merchant operating the POS device conventionally swipes the payment card through a magnetic strip reader on a POS device, and then enters the amount of the transaction using a keypad. Other methods of performing card transactions, e.g. by telephone or the Internet, are well known in the art. The exact manner of entering the payment card details and the transaction details are unimportant in the context of the present invention.

The individual payment card transactions may be either a conventional (unconverted) transaction or a converted transaction. In a conventional transaction, the transaction is performed in the currency of the merchant. In a conventional transaction, if the cardholder's account operates in a different currency to that of the merchant, the cardholder's bank performs a conversion into the currency of the cardholder's account at the time of posting the transaction to their account. This conversion generally takes place some time, even days, after the initial transaction has been completed.

Conventional transactions are to be contrasted to converted transactions, where the transaction amount is converted into the currency of the cardholder's payment card account prior to submission of the transaction to the banks for processing. An example of a converted transaction is a dynamic currency converted transaction. An example of a dynamic currency conversion system is described in WO01/0486.

In the exemplary scheme shown, each of the POS devices 1 is adapted to handle conventional and/or converted payment card transactions. For each transaction conducted on a POS device, a transaction record is created and stored on the POS device.

An exemplary conventional transaction record 100 is shown in FIG. 1. The transaction record identifies the date of the transaction 3, the name of the cardholder 4, the card number of the cardholder 5, the expiry date of the card 6, the name of the merchant 7, the merchant code 8 and the transaction amount 9. The transaction record may include other information and fields.

An exemplary converted transaction 200 is shown in FIG. 2. Fields that are the same as those fields described previously for a conventional transaction are given the same reference numerals. The converted transaction has a number of fields corresponding to the fields contained in a conventional transaction, such as the name of the cardholder 4, the card number of the cardholder 5, the expiry date of the card 6, the name of the merchant 7, the merchant code 8 and the transaction amount 9 etc.

The converted transaction record may also include other information and fields present in conventional transaction records. In addition, to these fields the converted transaction record contains data in a number of additional fields, which identify the transaction as being a converted transaction. These fields may include a field to store the transaction amount in the currency of the cardholder 11 and/or a field to store the exchange rate used in the conversion 10. Other fields that may be provided include a currency identifier field for identifying the currency of the cardholder.

It will be appreciated that the same field structure may be used for converted and unconverted transactions with an identifier or other means used to distinguish between the two types of transaction. For example, a conventional transaction could be distinguished from a converted transaction by the absence of data (or the presence of null values) in fields relating to converted transactions, e.g. the converted amount field or exchange rate field.

The individual transaction records are uploaded to the intermediate host 2, for example as a batch process at the end of each day or at any time during or at the end of the transaction creation and capture cycle.

To facilitate the uploading of transaction records, the POS devices 1 are suitably adapted to communicate with the intermediate host using appropriate communication means, typically by modem over a telephone line.

The intermediate host 2 is adapted to receive the transaction records from the POS devices 1 and to process. The intermediate host 2 subsequently forwards the transaction records onto the computer systems associated with acquiring banks, which are ultimately responsible for the processing of the payment card transactions.

Upon receipt of the individual transaction records, the intermediate host 2 may perform some checks and verification routines to ensure the accuracy of the records submitted. The intermediate host 2 may then separate the converted transactions from the conventional transactions. The conventional transactions are forwarded for processing in accordance with the methods of the prior art to the merchant's acquiring bank 12, which in turn forwards the transaction to the payment card schemes 13. The card payment schemes 13 ensure that the correct charges are applied to appropriate cardholders' accounts.

In the prior art, the converted transactions were forwarded directly to the currency conversion scheme 14 or an associate of the currency conversion scheme to facilitate transactions to be processed through a multi-currency bank 15. The multi-currency bank 15 in turn forwards the transactions to the payment card schemes 13, who in turn apply the charges to appropriate cardholder's accounts.

Figure 4:
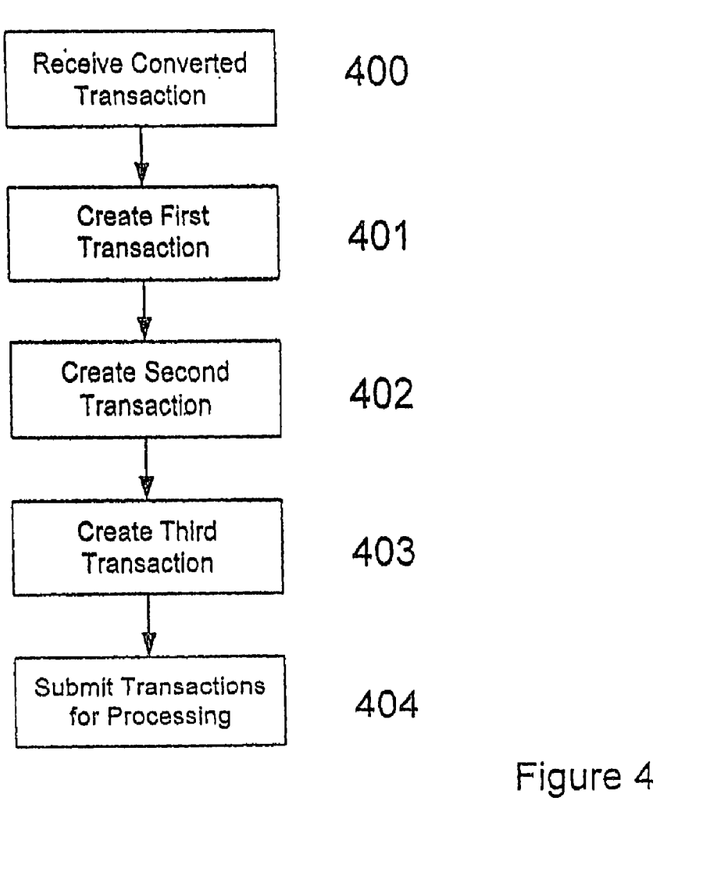
FIG. 4 is a flowchart of a method according to the present invention.

In the present invention, an exemplary implementation of which is shown in FIG. 4, a number of new transaction records are created from each convertible transaction record generated from a POS device, and at least one of these new transaction records is submitted for processing to the merchant's acquiring bank.

The exemplary method, illustrated in FIG. 4, will now be described with reference to the exemplary converted transaction record 200 shown in FIG. 2, which identifies a record for a converted payment card transaction between a merchant and a cardholder for an amount. This converted payment card transaction record may be received by a host from the POS device of the merchant.

Once the convertible payment card transaction record is received by a host 400, the host commences generating a number of payment transaction records.

Figures 5, 6:
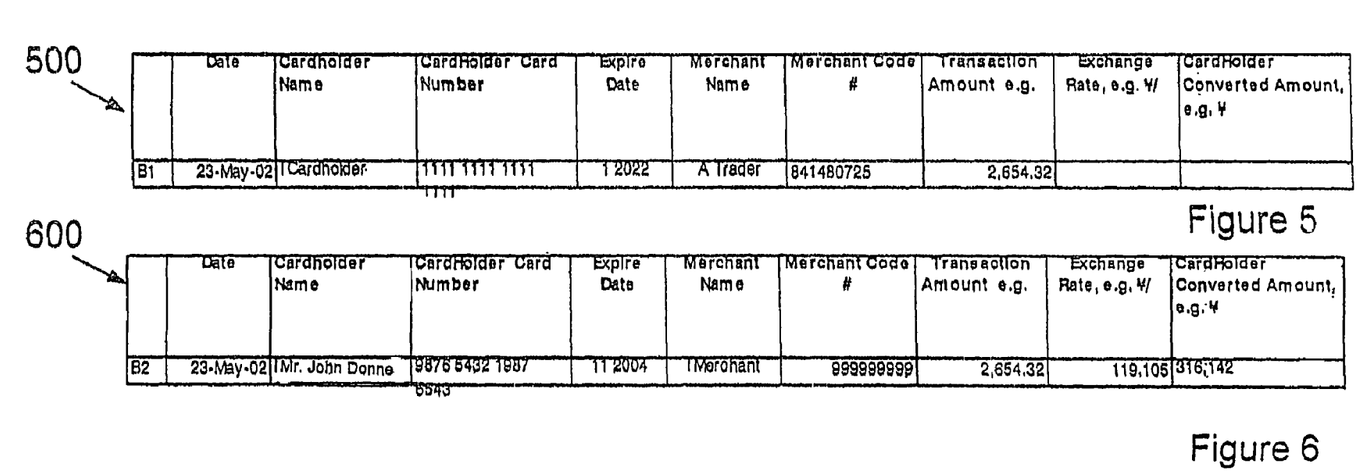
FIG. 5 is an example of a first transaction according to the present invention.
FIG. 6 is an example of a second transaction according to the present invention.

In particular, a first transaction record is created 401 between the merchant and a second cardholder for the same amount as the received transaction record. This first transaction record identifies an unconverted transaction between the merchant and a second cardholder. An exemplary resulting first transaction record 500 is shown in FIG. 5. This newly created first transaction record may be created by amending the received record.

The second cardholder identified in the first transaction record 500 is a cardholder account or pseudo cardholder of an intermediary possibly for example the operator or an associate of the operator of the currency conversion scheme.

Thus the resulting transaction created, effectively creates a debit from the intermediary cardholder to the merchant. This first transaction may subsequently be submitted to the acquiring bank 12 of the merchant for payment processing in the same way as the conventional (unconverted) transaction records. A record will thus exist in the acquiring bank 12 of the merchant showing a credit to the merchant's account. This credit will appear as a conventional payment card transaction between the merchant and a second cardholder (which in the present example is the operator or an associate thereof of the currency conversion scheme).

Accordingly, charges, reports and calculations for the merchant may be performed without any requirement for alteration of the software of the acquiring banks or the posting and subsequent removing or "fixing" of ghost transactions.

In addition, to the creation of the first transaction record 500, a host creates 402 a second transaction record, illustrated for example in FIG. 6. This second transaction record 600 identifies a transaction between a second merchant and the first cardholder. In the present example, the second merchant is a merchant account associated with the intermediary, which may for example be the operator or an associate of the operator of the currency conversion scheme. The second transaction record 600 is a converted transaction record and thus contains a second transaction amount in a second currency (that of the cardholder) equating to the first transaction amount converted into the second currency. Thus, a payment card transaction is effectively created which credits an intermediary or pseudo merchant, possibly, for example, an operator or an associate of the operator of the currency conversion scheme, and debits the cardholder.

This second transaction record 600 may be submitted for payment processing, as in the prior art, to the currency conversion scheme 14 for onward submission via a multi-currency bank 15 and subsequently the card schemes 13.

As the cardholder is effectively replaced by a second (intermediary) cardholder in the first transaction record, the subsequent processing of the second transaction by a dynamic currency conversion will not cause a double debit in respect of the first cardholder. Thus the necessity of re-writing an acquirer's software to avoid any such related double debit is avoided. Similarly, from the perspective of the acquirer and/or its merchant handling of transactions processed for the merchant, the acquirer systems do not have to be amended to introduce, cater and/or receive ghost transactions for the purposes of amalgamation and/or calculating service charges for the merchant.

The above described method in effect creates two transactions, the net result of which is a debit from the cardholder and a credit to the merchant, with a third party acting as an intermediary and having a merchant account and a cardholder account.

It will be appreciated that the merchant account of the intermediary will accumulate funds (credit), whilst the cardholder account of the intermediary will be debited. To prevent inconsistencies arising in the operation of the acquiring banks systems, it may be necessary to offset the balances in the intermediary's merchant account against those in the intermediaries cardholder account. This could for example be implemented using a daily transfer from the intermediary's merchant account to the intermediary's cardholder account. Such a transfer could be implemented at the end of each day for the outstanding account balance as a payment card transaction between the intermediaries cardholder and the intermediaries merchant account, in effect a refund.

Figure 7A:
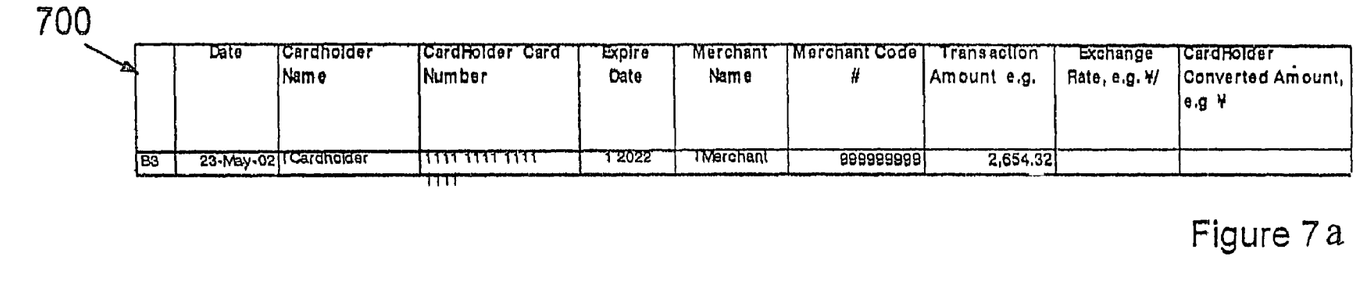
FIG. 7a is an example of a third transaction according to the present invention.
Figure 7B:
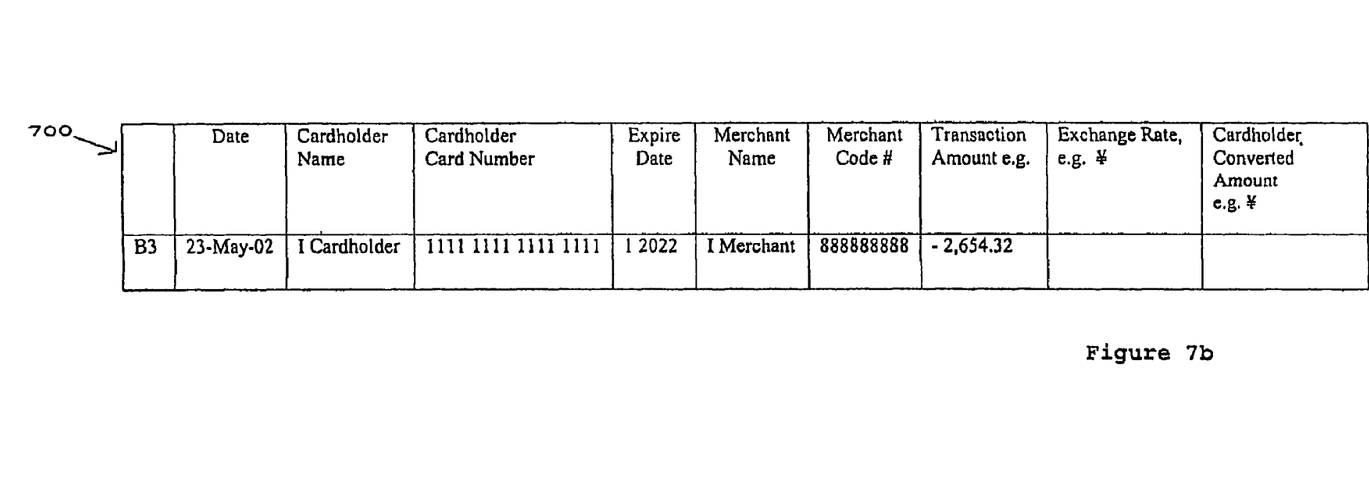
FIG. 7b is an example of a transaction where the two merchant numbers are not the same.

Another approach is to effectively perform a transfer between the intermediary's merchant account and the intermediary's cardholder account for each converted transaction. Thus, in addition, to the creation of the two transaction records described above, a third transaction 700 may be created 403 as shown by example in FIG. 1. This transaction represents a conventional payment card transaction between the intermediary's merchant account and the intermediary's cardholder account. This third transaction 700 may be submitted, for example to the merchant's acquiring bank for processing 404. As shown in FIG. 7*b* the merchant numbers need not be the same in this invention. In other words the pseudo merchant should be one and the same, but not the merchant number.

Although the present invention has been described with reference to an intermediate host, it will be appreciated that the crux of the present invention is the conversion of a single payment card transaction into two or more separate payment card transactions (as appropriate) using an intermediary as the join between the two or more separate transactions. It will further be appreciated that this concept may be applied in a number of different ways to achieve the desired end result. For example, the splitting into two or more transactions may be performed at the POS terminal, the intermediate host or a combination of the two.

Although dynamic currency conversion offers significant advantages to foreign customers of merchants, some merchants nonetheless receive a portion of the resultant additional revenue in handling dynamic currency converted transactions. Accordingly, there is a general need to settle merchants additional revenue based on the value of dynamic currency transactions conducted. Similarly, the multi-currency banking partner member card scheme processor (MBP-MCSP) which is responsible for processing the multi-currency payment transactions into the payment card systems generally charges an additional fees for the extra work required in processing a multi-currency transaction as compared to a conventional unconverted transaction.

It will thus be appreciated that for any one transaction there are a number of settlement measures required to ensure that the requisite funds are distributed appropriately and that appropriate balances occur. The present invention may be modified by the inclusion of one or more further payment card transactions to achieve one or more of these objectives as described below.

In particular, to settle individual merchants their proportion (where applicable) of any additional revenue in handling dynamic currency converted transactions, a further transaction record may be created. The amount of this further transaction, herein after referred to as a merchant additional revenue card transaction, would represent the additional revenue to be settled to the merchant. The merchant additional revenue card transaction would be between the second cardholder (described above) or another pseudo cardholder of the operator or an associate of the operator of the currency conversion scheme and the first merchant. For convenience, the individual additional revenue to be settled to a merchant may be amalgamated into a single merchant additional revenue card transaction record for example at the end of each day, week or month. The merchant additional revenue card transaction record may be posted for processing by the card schemes as a conventional card transaction. A less preferred alternative method would be for the first merchant to have their own cardholder account to which their additional revenue may be settled as described above as a refund from the second merchant or an associated merchant thereof.

Similarly, an additional transaction record may be created to pay the MBPMCSP their fee for handling the transaction. This transaction, hereinafter referred to as the MBPMCSP transaction, would represent the fee payable to the MBPMCSP. The MBPMCSP transaction may be between the second cardholder (described above) or another pseudo cardholder of the operator or an associate of the operator of the currency conversion scheme and a merchant (account) associated with the MBPMCSP. For convenience, the individual fees payable to the MBPMCSP may be amalgamated into a single MBPMCSP card transaction for example at the end of each day, week or month. A less preferred alternative method would be for the MBPMCSP to have their own cardholder account to which their fees may be paid as described above as a refund from the second merchant or an associated merchant thereof.

In addition, it is accepted that the primary driving factor for implementing dynamic currency conversion is that the operator of the dynamic currency conversion scheme benefits financially from additional revenue. The presence of additional revenue does however create an imbalance between the various transactions described above. This may best be explained by way of an example. Consider the case where a nominal €100 transaction is conducted at a point of sale for a Japanese cardholder. This transaction may, for example, be quoted to the cardholder at a rate of 119¥/€ or ¥11,900. However, when the ¥11,900 transaction is processed and returned from the Card Schemes via the MBPMCSP to the dynamic currency conversion scheme operator, it may be converted to say €103 by the dynamic currency conversion scheme operator. Of this total amount, €100 is effectively routed to the merchant as payment in respect of the transaction whereas the €3 additional revenue is routed to/through the dynamic currency conversion scheme operator.

To operate this scheme successfully requires the dynamic currency conversion scheme operator to set up effective ring-fenced accounts in the relevant currencies as well as a further central account in the real merchant's currency, which in the European Eurozone would be the Euro.

Although the above method has been described with respect to the operator of the dynamic currency conversion scheme being associated with the second cardholder account and second merchant account, an alternative approach would be for these accounts to be associated accounts of the MBPMCSP, i.e. for the intermediary accounts to be the MBPMCSP. This may advantageously be employed to cleanly efficiently and effectively delineate the dynamic currency conversion scheme operator additional revenue for the transaction from the substantive transaction. In particular, this may be achieved by reducing the amount of the third transaction 700 (described above) by an amount equating to the additional revenue and creating a further transaction for an amount equating to the additional revenue. This further card transaction would be between the second (intermediate) merchant and a cardholder account associated with the dynamic currency conversion scheme operator. Alternatively, the transaction could be performed as a refund from the cardholder account of the second merchant to a merchant account associated with the dynamic currency conversion scheme operator.

It will be appreciated that a number of suitable combinations of the methods described above are possible and a number of variants may be implemented, with suitable amendment, without deviating from the scope of the present invention. For example, in one embodiment the intermediary merchant and/or cardholder may represent the same entity but with distinct merchant-cardholder accounts for each.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A method for effecting the performance of a payment card transaction for a first transaction amount between a first merchant and a first cardholder, the method comprising the steps of:
    a) in response to initiation of the payment card transaction between the first merchant and the first cardholder at a point of sale (POS) device, creating, at a host processor, a first payment card transaction record between the first merchant and a second cardholder for the first transaction amount in a first currency,
    b) in response to the initiation of the payment card transaction between the first merchant and the first cardholder, creating a second payment card transaction record between a second merchant and the first cardholder, wherein the second transaction record identifies a second transaction amount in a second currency which equates to the first transaction amount converted into the second currency, and
    c) submitting the first transaction record and the second transaction record for processing as respective first and second payment card transactions, whereby processing said first record credits said first merchant and processing said second record debits said first cardholder.

2. A method for effecting the performance of a payment card transaction according to claim 1, wherein the step of submitting the first transaction record and the second transaction record for processing comprises the step of submitting the first transaction record for processing as an unconverted payment transaction.

3. A method for effecting the performance of a payment card transaction according to claim 1, wherein the step of submitting the first transaction record and the second transaction record for processing comprises the step of submitting the second transaction record for processing as a converted payment card transaction.

4. A method for effecting the performance of a payment card transaction according to claim 1, further comprising the steps of:
creating, in response to the initiation of the payment card transaction between the first merchant and the first cardholder, a third payment card transaction record between the second cardholder and the second merchant for an amount in the first currency, the amount being the negative equivalent of the first transaction amount; and
submitting the third payment card transaction record for payment processing, whereby processing credits the second merchant and debits the second cardholder.

5. A method for effecting the performance of a payment card transaction according to claim 4, wherein the third payment card transaction record is submitted as an unconverted payment card transaction.

6. A method for effecting the performance of a payment card transaction according to claim 4, further comprising the initial step of determining whether a transaction is a dynamic currency convertible transaction prior to performing the steps of creating the one or more transaction records.

7. A method for effecting the performance of a payment card transaction according to claim 4, further comprising the step of posting the first and/or second and/or third payment card transaction records to a host computer system associated with an acquiring and/or multi-currency bank.

8. A method according to claim 1, further comprising the step of creating a merchant additional revenue card transaction record between the second or a related cardholder and the first merchant, wherein the merchant additional revenue card transaction record identifies a transaction amount which equates to additional revenue to be settled to the first merchant in response to using dynamic currency conversion to engage in the payment card transaction with the first cardholder.

9. A method according to claim 1, further comprising the step of creating a merchant additional revenue card transaction record between a cardholder account of the first merchant and the second merchant or an associated merchant thereof, the transaction record representing a refund which equates to additional revenue to be settled to the first merchant in response to using dynamic currency conversion to engage in the payment card transaction with the first cardholder.

10. A method according to claim 1, further comprising the step of creating a multi-currency banking partner member card scheme processor (MBPMCSP) card transaction record between the second or a related cardholder and a merchant associated with the MBPMCSP, wherein the MBPMCSP card transaction record identifies a transaction amount equating to the fees payable to the MBPMCSP for processing the payment card transaction as a dynamic currency transaction.

11. A method according to claim 1, further comprising the step of creating a MBPMCSP card transaction record between a cardholder account of the MBPMCSP and the second merchant or an associated merchant thereof, the MBPMCSP card transaction record representing a refund which equates to the fees payable to the MBPMCSP for processing the payment card transaction as a dynamic currency transaction.

12. A computer program having code embodied therein which when implemented on a computer effects the methods of claim 1.

13. A system adapted to effect the performance of a payment card transaction, the system comprising:

means for receiving details of the payment card transaction between a first merchant and a first cardholder, the details including a first transaction amount,
means for creating a first payment card transaction record between the first merchant and a second cardholder for the first transaction amount in a first currency in response to receiving the details of the payment card transaction,
means for creating a second payment card transaction record between a second merchant and the first cardholder in response to receiving the details of the payment card transaction, wherein the second transaction record identifies a second transaction amount in a second currency which equates to the first transaction amount converted into the second currency, and
means for submitting the created first and second payment card transaction records to a host for processing as respective payment card transactions, whereby processing the first payment card transaction credits said first merchant and processing the second payment card transaction debits said first cardholder.

14. A system adapted to effect the performance of a payment card transaction according to claim 13, wherein the means for submitting the created first and second payment card transaction records is adapted to submit the first transaction record for processing as an unconverted payment transaction in the second currency.

15. A system adapted to effect the performance of a payment card transaction according to claim 13, wherein the means for submitting the created first and second payment card transaction records is adapted to submit the second transaction record for processing as a converted payment transaction in the first currency.

16. A system adapted to effect the performance of a payment card transaction according to claim 13, further comprising:
means for creating, in response to receiving the details of the payment card transaction, a third payment card transaction record between the second cardholder and the second merchant for an amount in the first currency, the amount being the negative equivalent of the first transaction amount; and
means for submitting the third payment card transaction record for payment processing, whereby processing credits the second merchant and debits the second cardholder.

17. A system adapted to effect the performance of a payment card transaction according to claim 16, wherein the means for submitting created transaction records is suitably adapted to submit the third transaction record for processing as an unconverted payment transaction.

18. A system adapted to effect the performance of a payment card transaction according to claim 13, further comprising means for determining whether a transaction is a dynamic currency convertible transaction prior to performing the steps of creating the one or more transaction records.

19. A system adapted to effect the performance of a payment card transaction according to claim 13, wherein the system comprises a payment card terminal.

20. A system adapted to effect the performance of a payment card transaction according to claim 13, wherein the system comprises an intermediate or other host computer system adapted to receive payment transaction records from a payment card terminal or other device and route them for processing as either converted or unconverted transactions.

21. A system adapted to effect the performance of a payment card transaction according to claim 13, further comprising means for creating a merchant additional revenue card transaction record between the second or a related cardholder and the first merchant, wherein the merchant additional revenue card transaction record identifies a transaction amount which equates to additional revenue to be settled to the first merchant in response to using dynamic currency conversion to engage in the payment card transaction with the first cardholder.

22. A system adapted to effect the performance of a payment card transaction according to claim 13, further comprising means for creating a merchant additional revenue card transaction record between a cardholder account of the first merchant and the second merchant or an associated merchant thereof, the transaction record representing a refund which equates to additional revenue to be settled to the first merchant in response to using dynamic currency conversion to engage in the payment card transaction with the first cardholder.

23. A system adapted to effect the performance of a payment card transaction according to claim 13, further comprising means for creating a multi-currency banking partner member card scheme processor (MBPMCSP) card transaction record between the second or a related cardholder and a merchant associated with the MBPMCSP, wherein the MBPMCSP card transaction record identifies a transaction amount equating to the fees payable to the MBPMCSP for processing the payment card transaction as a dynamic currency transaction.

24. A system adapted to effect the performance of a payment card transaction according to claim 13, further comprising means for creating a MBPMCSP card transaction record between a cardholder account of the MBPMCSP and the second merchant or an associated merchant thereof, the MBPMCSP card transaction record representing a refund which equates to the fees payable to the MBPMCSP for processing the payment card transaction as a dynamic currency transaction.

25. A system adapted to effect the performance of a payment card transaction according to claim 13, wherein the first currency is a merchant currency specified for the first merchant and the second currency is a cardholder currency specified for the first cardholder.

26. A system adapted to effect the performance of a payment card transaction according to claim 13, wherein the details of the payment card transaction further include the first transaction amount in the cardholder currency.

27. A method for processing a payment card transaction between a merchant and a cardholder using a payment card at a point of service (POS) device, said payment card transaction including a transaction amount, and said method comprising:
    receiving, at a host processor, a converted transaction record for said payment card transaction, said converted transaction record including said transaction amount in a first currency specified for said cardholder;
    in response to said receiving operation, creating a first transaction record between said merchant and an intermediate cardholder account for said transaction amount in a second currency specified for said merchant;
    in response to said receiving operation, creating a second transaction record between said cardholder and an intermediate merchant account for said transaction amount in said first currency, said transaction amount of said second transaction record in said first currency being equivalent to said transaction amount of said first transaction record in said second currency;
    submitting said first transaction record for processing, whereby processing said first transaction record debits said transaction amount from said intermediate cardholder account and credits said transaction amount to said merchant; and
    submitting said second transaction record for processing, whereby processing said second transaction record debits said transaction amount from said cardholder account and credits said transaction amount to said intermediate merchant account.

28. A method as claimed in claim 27 wherein:
    said processing said first transaction record credits said transaction amount to said merchant in said second currency; and
    said processing said second transaction record debits said transaction amount from said cardholder in said first currency.

29. A method as claimed in claim 27 further comprising:
    creating a third transaction record between said intermediate cardholder account and said intermediate merchant account for an amount in the second currency, the amount being the negative equivalent of said transaction amount; and
    submitting the third payment card transaction record for payment processing, whereby processing credits said transaction amount to said intermediate merchant account and debits said transaction amount from said intermediate cardholder account.

* * * * *